United States Patent [19]

Ruehle

[11] Patent Number: 4,509,149
[45] Date of Patent: Apr. 2, 1985

[54] DIRECTIONAL LONG ARRAY FOR LOGGING VERTICAL BOUNDARIES

[75] Inventor: William H. Ruehle, Duncanville, Tex.

[73] Assignee: Mobil Oil Corporation, New York, N.Y.

[21] Appl. No.: 309,647

[22] Filed: Oct. 8, 1981

Related U.S. Application Data

[63] Continuation of Ser. No. 57,776, Jul. 16, 1979, abandoned.

[51] Int. Cl.³ .............................................. G01V 1/40
[52] U.S. Cl. ...................................... 367/27; 367/22; 367/23; 367/57; 367/61; 181/104
[58] Field of Search ....................... 367/27, 34, 25, 56, 367/57, 61, 138, 911, 22, 23, 47; 181/103, 104, 107

[56] References Cited

U.S. PATENT DOCUMENTS

| | | | |
|---|---|---|---|
| 2,021,943 | 11/1935 | McCollum | 367/57 |
| 2,992,694 | 7/1961 | Musgrave et al. | 367/23 |
| 3,346,068 | 10/1967 | Woods et al. | 367/61 |
| 3,406,777 | 10/1968 | Bemrose | 367/23 |
| 3,629,796 | 12/1971 | Brownscombe et al. | 367/61 |
| 3,766,519 | 10/1973 | Stephenson | 367/61 |
| 3,961,307 | 6/1976 | Hochheimer | 367/48 |
| 4,123,744 | 10/1978 | Ingram | 367/29 |
| 4,346,462 | 8/1982 | Boullay | 367/61 |

OTHER PUBLICATIONS

Morgan, "A Novel Broad Band Beamformer", 9/74, pp. 1013–1015, J. Acous. Soc. Am., vol. 56, #3.

Primary Examiner—Nelson Moskowitz
Attorney, Agent, or Firm—A. J. McKillop; Michael G. Gilman; George W. Hager, Jr.

[57] ABSTRACT

A logging sonde has directivity control of multiple sources and receivers in linear arrays. Each of the sources produces acoustic pulses which are delayed by a time delay between the sources to direct acoustic energy at an angle such that the resulting acoustic wave strikes a vertical formation orthogonally. The reflections of the acoustic pulses are detected with a linear array of receivers. The acoustic pulse detected by each receiver is delayed by an amount such that the total differential moveout for a reflected directional wave is zero.

6 Claims, 6 Drawing Figures

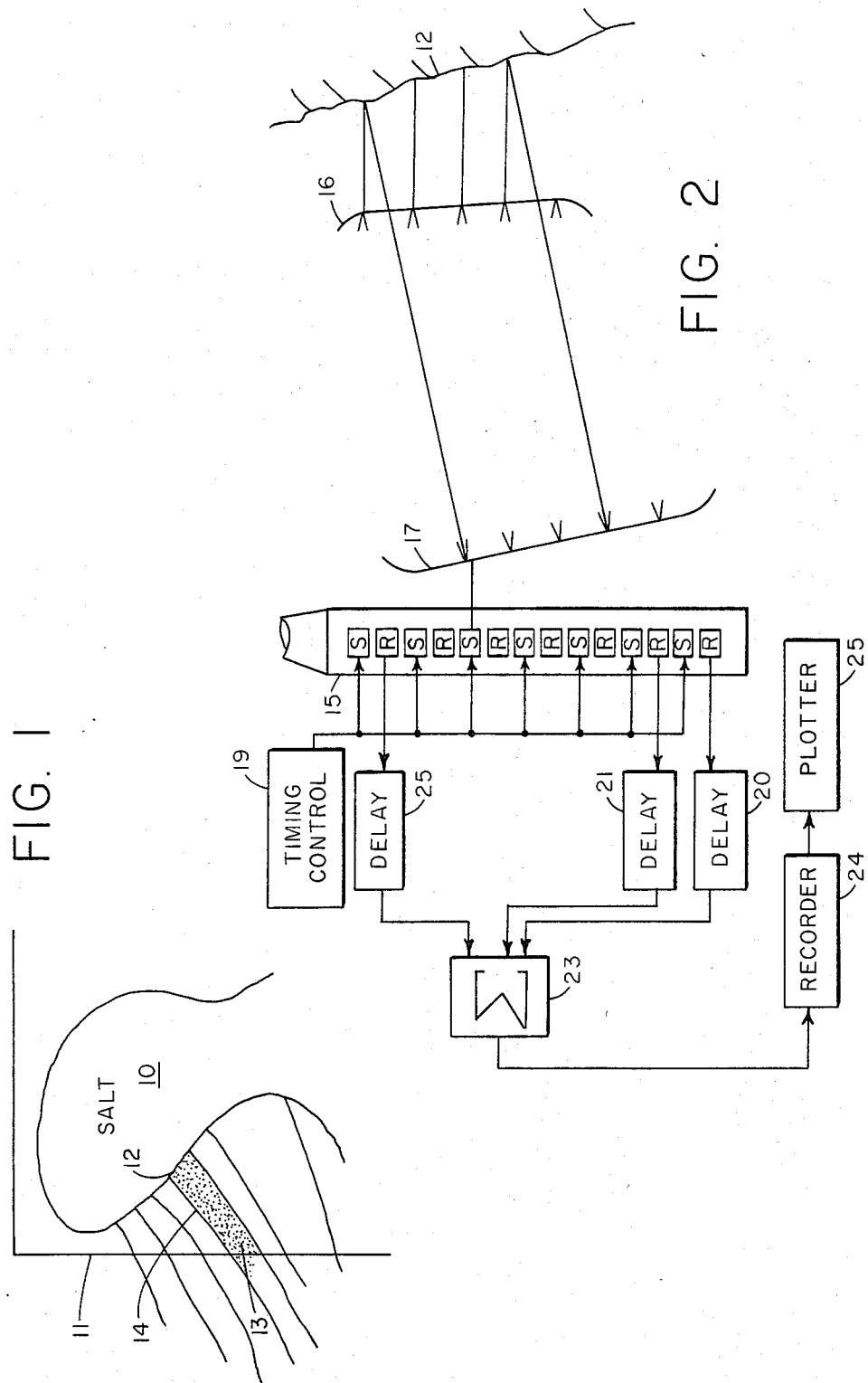

DIRECTIONAL LONG ARRAY FOR LOGGING VERTICAL BOUNDARIES

This is a continuation, of application Ser. No. 057,776 filed July 16, 1979, now abandoned.

BACKGROUND OF THE INVENTION

This invention relates to a logging sonde and a method of using it to define the shape of a vertical formation in the earth.

Very steep or substantially vertical boundaries are found in the earth, such as on the flanks of salt domes or igneous intrusions. Determining the boundaries of such formations is difficult. Conventional seismic exploration from the surface provides good definition of horizontally extending formations or formations dipping at substantial angles from the horizontal. However, it is not effective in areas with near vertical boundaries or with boundaries located beneath a formation which obscures the boundary from surface emanating seismic waves.

U.S. Pat. Nos. 1,909,205 McCollum, 2,021,943 McCollum, 2,813,590 McDonald and 3,483,505 Adair et al describe apparatus and methods for logging vertical formations from a borehole with a logging sonde. In these patents, acoustic energy from a single source strikes the vertical formation at various angles dependent upon the location of the source with respect to the attitude of the formation. The reflected acoustic energy is detected at detectors spaced a substantial distance from the source.

U.S. patent applications, Ser. No. 669,077, filed Mar. 22, 1976, Ruehle, Ser. No. 844,550, filed Oct. 25, 1977, Ruehle and Ser. No. 793,680, filed May 4, 1977, now U.S. Pat. No. 4,146,870, Ruehle describe and claim methods of marine seismic exploration wherein directivity of acoustic pulses emanating from a linear array of sources and directivity of a linear array of receivers is obtained.

SUMMARY OF THE INVENTION

In accordance with the present invention, acoustic pulses from multiple sources in a logging sonde are delayed one with respect to the other to direct the resulting acoustic wave at an angle such that the wave strikes a vertical formation orthogonally and/or the reflected energy impinges upon the receiver array orthogonally. Logging in this manner provides much better definition of a vertical formation for at least two important reasons.

First, it can be shown that for a given amount of source energy, a higher amplitude pulse can be propagated if the given energy is distributed over a number of point sources. By distributing the energy emanating from the logging sonde of this invention over a number of sources, an acoustic wave is produced having a higher amplitude than would be obtained by concentrating the same energy in a single source.

Secondly, by directing the acoustic wave at an angle such that it strikes the formation vertically, a good, high amplitude, reflection is obtained. Furthermore, the reflection travels directly back to the logging sonde where it is detected by a plurality of detectors. The acoustic waves are not attenuated by travel over long distances through the formations adjacent the borehole to and from the vertical formation. The energy from the source travels over the most direct path to the formation and back to the receivers so that the detected energy is maximized.

In accordance with the present invention, directivity of acoustic waves emanating from a plurality of sources in a logging sonde is obtained by delaying the pulses produced by the sources, one with respect to the other. Directivity of a linear array of receivers in the logging sonde is obtained by delaying the detected acoustic pulses one with respect to the other.

The foregoing and other objects, features and advantages of the invention will be better understood from the following more detailed description and appended claims.

BRIEF DESCRIPTION OF THE DRAWINGS

FIG. 1 depicts a salt dome of the type which can be defined with the aid of the present invention;

FIG. 2 shows the logging sonde of this invention;

DESCRIPTION OF THE PREFERRED EMBODIMENT

Figure 4:
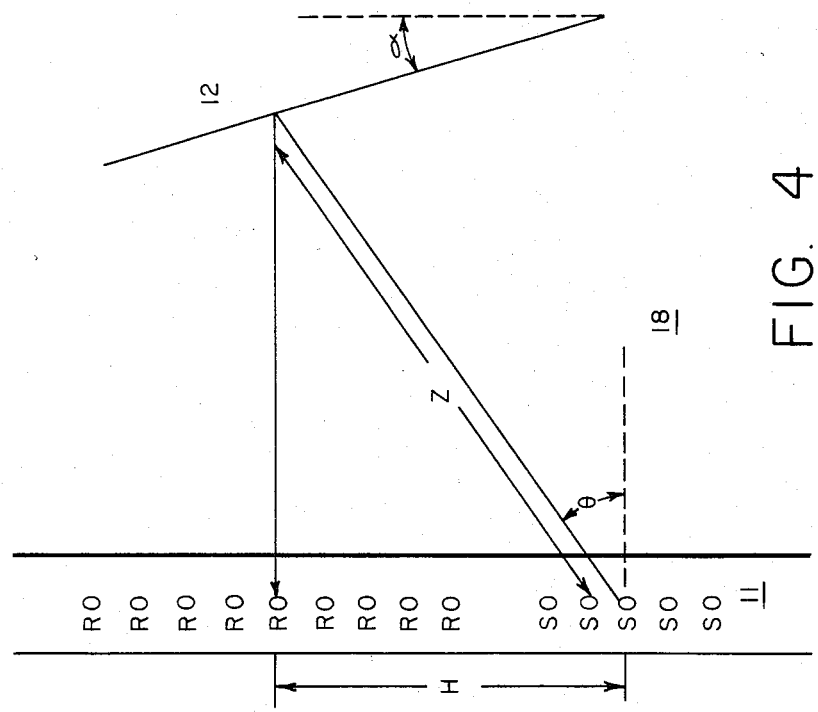
FIG. 4 is similar to FIG. 3 and shows the directivity where the acoustic energy strikes the receiver array orthogonally.

FIG. 1 depicts a salt dome 10 and borehole 11 which is drilled adjacent to the salt dome. Defining the exact location of the boundary 12 is particularly important.

Assume that traces of hydrocarbons have been found in the layer 13. It is necessary to determine if the layer 13 is blocked at the boundary 12 with the salt dome 10. If it is, a well should be drilled at approximately the point 14 where the layer 13 meets the boundary 12. In order to make this determination in accordance with the present invention, a logging sonde 15 with a linear array of sources S is lowered into the borehole. At various positions above, through and below the layer 13, recordings are taken with different directivities. For example, at each position that the tool is stopped, six or eight recordings may be taken, each with different directivities.

As the sources S produce pulses of acoustic energy with different delays, a seismic wave is produced. One such wave is indicated at 16. This acoustic wave is reflected from the boundary 12. By inserting different delays between the sources S, different directional waves will be obtained and one of these will strike the boundary 12 orthogonally. This wave will be reflected orthogonally. The orthogonal reflected wave is indicated at 17.

The reflected acoustic waves are detected by the receivers which are designated R.

Figure 3:
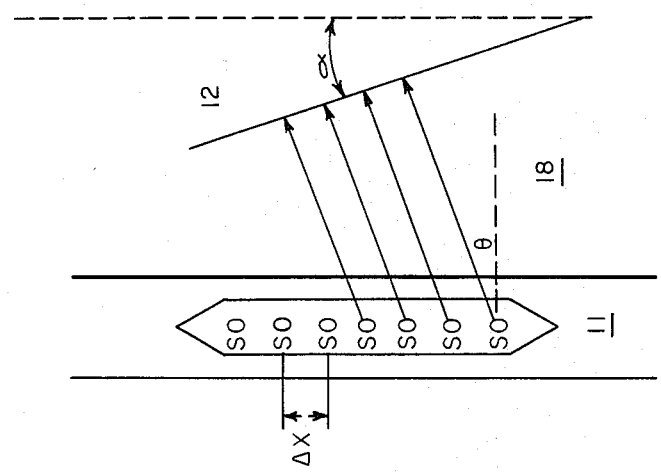
FIG. 3 shows in more detail the angle of directivity of the sonde.
Figure 5:
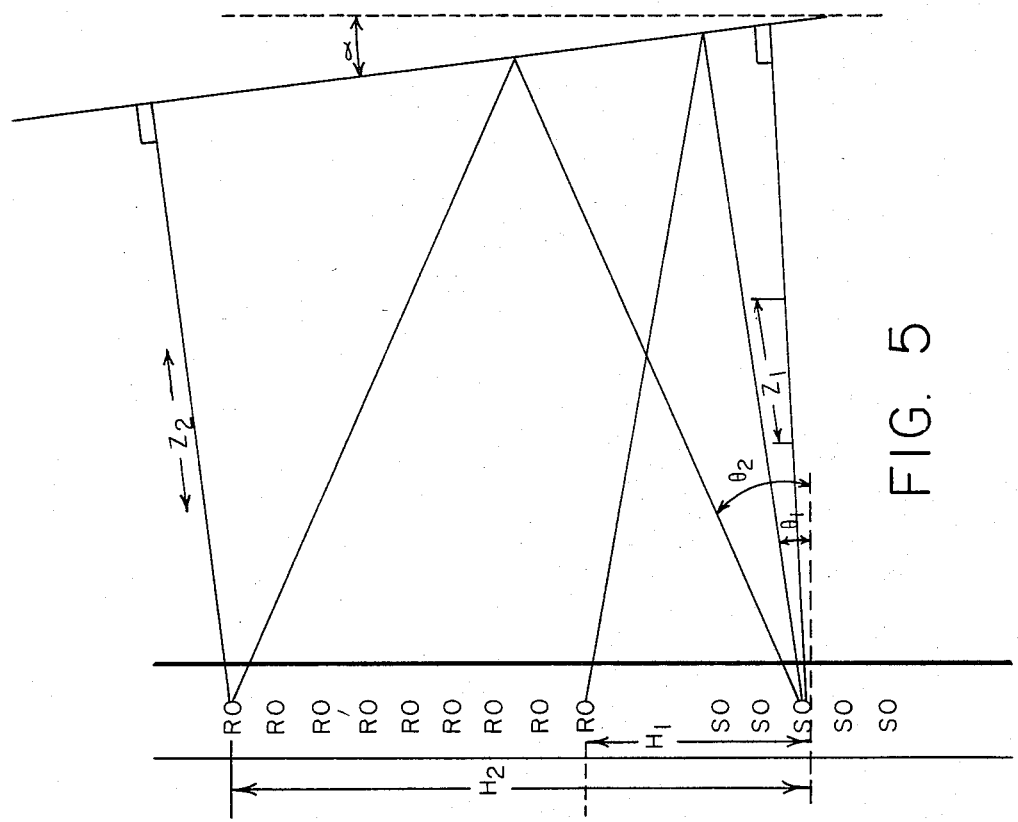
FIG. 5 is similar to FIGS. 3 and 4 and shows the limits of the directivity angle.

Referring to FIG. 3, directivity of the linear array of sources S is obtained by delaying the time of firing of successive sources. In FIG. 3 $\alpha$ is the angle between the boundary 12 and the vertical. As shown in FIG. 3, the acoustic wave from the sources travels through the borehole 11 and through the formation 18 between the borehole and the boundary 12. This wave will strike the boundary 12 orthogonally when the time delay between successive sources is given by:

$$\tau = (\Delta X/V) \sin \theta$$

where $\Delta X$ is the spacing between sources, and $\theta$ is the directivity angle. V is the effective near-field velocity which, in practice, is approximately the average velocity across a one-wavelength annulus surrounding the source and receiver sonde. This velocity is referred to throughout this description. $\alpha$ is the angle between the boundary 12 and the vertical. $\theta$ is equal to $\alpha$ when the receivers and detectors are interspersed and coextensive as shown in FIG. 2. They need not be. FIGS. 4 and 5 depict a logging tool in which sources and receivers are not coextensive. In this case $\theta \neq \alpha$.

Where it is desired to have the energy strike the receivers orthogonally $\theta = 2\alpha$ and $H = X \sin \alpha$, where H is the center to center displacement of the source and receiver arrays and X is distance from the center of the source array to the formation. This is depicted in FIG. 4.

In general, reflected energy should strike the receiver array between its limits, which are at the distances $H_1$ and $H_2$ from the center of the source array as shown in FIG. 5. The directivity angle should be between $\theta_1$ and $\theta_2$. The limits of the directivity angle are related to $\alpha$, $H_1$, $H_2$, and the tool to formation distances $Z_1$ and $Z_2$ by the following:

$$\frac{2 Z_1 \cos \alpha}{[(2 Z_1)^2 + (H_1)^2 - 2(2 Z_1 H_1)\sin^\alpha]^{\frac{1}{2}}}$$

$$\frac{2 Z_2 \cos \alpha}{[(2 Z_2)^2 + (H_2)^2 - 2(2 Z_2 H_2) \sin^\alpha]^{\frac{1}{2}}}$$

In practice, the approximate angle $\alpha$ may be known from other surveys. Then the time delay between the sources can be set in accordance with the above relationships so that the acoustic waves have the desired directivity angle $\theta$. Alternatively, surveys can be made with different time delays so that acoustic waves of different directivity angles are produced. If these span the correct range, one of the firings will produce an acoustic wave with optimum detected reflected energy.

Timing control 19 fires the sources in a time sequence with the time delay $\tau$ between each source. One example of such a control circuit is shown in U.S. Pat. No. 3,687,218—Ritter.

As pointed out in my copending application identified above, the seismic energy produced by the source has a directivity pattern. Introducing the time delay $\tau$ between the firing of each of the sources has the effect of pointing the major lobe of the directivity pattern or the polar response.

Directive receiver arrays are described in the same way. In this case, it is desired to introduce a delay $\tau$ between each of the receivers R. The outputs of delays 20, 21, and 25 are combined in the summer 23.

Figure 6:
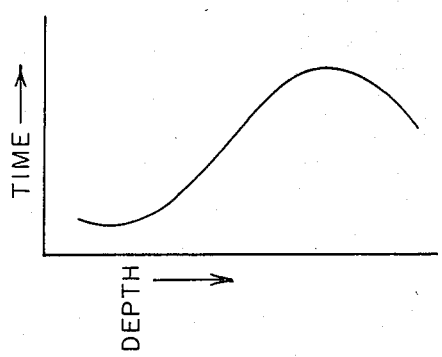
FIG. 6 is an output plot of travel time at various spaced points along the borehole.

The total differential move-out for a directional wave received by a long array of receivers is given by:

$$\Delta T = n\tau - n\Delta X (\sin \theta / V)$$

where n is the number of receivers in the array, $\Delta X$ is the spacing between them, $\theta$ is the angle between the normal and the reflection, V is the effective near field velocity of seismic energy, and $\tau$ is the delay of each receiver. In this case, it is desired to delay the recordings from successive receivers by a delay $\tau$ such that $\Delta T$ will be zero. This will render the array of receivers directionally selective to reflections from the boundary of interest. The travel time from source to reflector and back of the maximum detected energy is recorded in the recorder 24. Plotter 25 produces a plot of a series of recorded travel times obtained at spaced points along the borehole. FIG. 6 shows recorded travel times from the borehole to the variable shape vertical formation boundary 12 at spaced points along the borehole 11. In this manner, a plot showing the shape of the boundary is obtained.

In some situations it may be desirable to direct both the source array and the receiver array at an angle $\theta$ so that the acoustic energy from the source strikes the boundary orthogonally, is reflected, and is received by a receiver array tuned to the angle $\theta$.

Sources which are suitable for use include spark, magnetostrictive, and compressed air sources. A particularly suitable source is a one-half cubic inch or one cubic inch air gun of the type which is commercially available, for example, from Bolt Associates, Inc. In general, a very low frequency source is required. Generally it is necessary for the source to travel at least several hundred feed through the formations and the source should be capable of propagating a wave for at least 1,000 feet.

The length of the array between the two extreme sources should be longer than the longest wavelength that it is desired to propagate or for which directivity is desired. The shortest spacing $\Delta X$ should be shorter than the shortest wavelength that is to be propagated or for which directivity is desired. One type of receiver which is particularly suitable for use in the logging sonde of this invention is the receiver shown in U.S. Pat. No. 3,369,626—Zemanek.

The construction of the logging sonde itself, the means for lowering it into the borehole, and for recording signals therefrom, are conventional. While any precise delay device is suitable for introducing delay between the recordings from the receivers, digital delay techniques such as commonly employed in seismic signal processing as implemented with a digital computer are particularly suitable.

It is understood that this description is with respect to a vertical borehole. Where the borehole is not vertical, one must measure interface angles with respect to the axis of the sonde.

While particular embodiments of the invention have been shown and described, various modifications are within the true spirit and scope of the invention. The appended claims are intended to cover all such modifications.

What is claimed is:
1. A method of logging a variable shape vertical formation in the earth from a borehole comprising:
   traversing said borehole with a linear array of interspersed and coextensive acoustic sources and acoustic receivers,
   producing acoustic pulses from the acoustic sources of said array at spaced points along said borehole,
   detecting the reflections of said acoustic pulses from the boundary of said vertical formation with the receivers of said array,
   changing the directivity angle of the acoustic pulses of said array at each of said spaced points along said borehole through a range including that angle at which said acoustic pulses strike the formation orthogonally and are reflected orthogonally to said array of receivers with maximum energy, recording the travel time only of the orthogonally reflected energy at each of the spaced points along said borehole, and plotting a series of recorded travel times in a display of travel time from the borehole to said variable shape vertical formation boundary at spaced points along said borehole.

2. The method recited in claim 1 wherein the step of changing the directivity angle comprises:

delaying the acoustic pulses produced by each source in said array by a time delay between said sources to direct acoustic energy at said angle;

delaying the signal representing said reflections of said acoustic pulses detected by each receiver by a delay such that the total differential moveout for a reflected directional wave with said angle is zero; and combining the delayed signals representing the detected acoustic pulses.

3. The method recited in claim 1 wherein the step of changing the directivity angle comprises:

delaying the acoustic pulses produced by each source in said array by a time delay between said sources to direct acoustic energy at said angle.

4. The method recited in claim 3 wherein said time delay is given by:

$$\tau = (\Delta X/V) \sin \theta$$

where $\tau$ is said time delay, $\Delta X$ is the spacing between said sources, $V$ is the velocity of the acoustic pulses and $\theta$ is said angle.

5. The method recited in claim 1 wherein said angle $\theta$ is equal to the vertical angle $\alpha$ of said formation.

6. The method recited in claim 1 wherein the step of changing the directivity angle comprises:

delaying the signal representing the acoustic pulse detected by each receiver by a delay such that the total differential moveout for a reflected directional wave with said angle is zero; and combining the delayed signals representing the detected acoustic pulses.

* * * * *